March 19, 1940.  W. R. WEAVER  2,194,238
DISPLAY DEVICE
Filed Oct. 24, 1938    7 Sheets-Sheet 1

March 19, 1940.                W. R. WEAVER                2,194,238
                                DISPLAY DEVICE
                            Filed Oct. 24, 1938        7 Sheets-Sheet 2

March 19, 1940.                W. R. WEAVER                 2,194,238
                              DISPLAY DEVICE
                          Filed Oct. 24, 1938        7 Sheets-Sheet 4

Fig. 6.

Inventor
W. R. Weaver
By H. R. Williamson & Co.
Attorneys

WITNESS
H. Woodard

March 19, 1940.  W. R. WEAVER  2,194,238
DISPLAY DEVICE
Filed Oct. 24, 1938   7 Sheets-Sheet 5

Inventor
W. R. Weaver

By H. R. Wilson & Co.
Attorneys

March 19, 1940.   W. R. WEAVER   2,194,238
DISPLAY DEVICE
Filed Oct. 24, 1938    7 Sheets-Sheet 7

WITNESS
H. Woodard

Inventor
W. R. Weaver
By H. O. Willson &co
Attorneys

Patented Mar. 19, 1940

2,194,238

UNITED STATES PATENT OFFICE 2,194,238

DISPLAY DEVICE

William Rutledge Weaver, El Paso, Tex.

Application October 24, 1938, Serial No. 236,732

21 Claims. (Cl. 312—99.5)

The invention aims to provide a new and improved display device, having one or more display racks, each of which carries a number of display compartments, and so operatively related that different displays are alternately or otherwise presented to view, and designed primarily for displaying and advertising merchandise but capable of use to equal advantage for educational, entertainment or similar purposes.

In its preferred embodiment, the device comprises a rotatable plate or platform which with its several related parts forms a display rack, having a number of display compartments and hereinafter designated the "interior display rack", a non-rotatable wall surrounding said interior display rack and having a view opening through which displays carried by said interior display rack are successively visible, a rotatable frame, capable of being detached, surrounding said wall which with its several related parts composes a display rack having a number of display compartments and hereinafter designated the "exterior display rack", and suitable driving means to produce alternate showing of the different displays carried by the exterior display rack in front of the view opening in said wall, and carried by the interior display rack back of the opening in said wall, the driving means being of such nature as to successively produce desired and timely operations of both the said interior display rack and said exterior display rack, and further objects of the invention are—

To provide a rotatable plate which forms the floor or platform of said interior display rack upon which articles may be placed when desired not to rotate independently of the motion of said interior display rack.

To provide the rotatable plate or platform with novel adjustable frames suitably mounted for holding display or background panels, and for permitting easy and desired change of same and their positional adjustment on said plate.

To provide suitable driving means and detachable supports to give motion to articles displayed within any given compartment of the interior display rack, independent of the other compartments, or the motion or rest of said rack.

To provide the aforesaid non-rotatable wall with exhibiting panels which are exposed and obscured by operation of aforesaid exterior display rack and to make provision for easily changing said panels as desired.

To provide novel changeable illuminating means capable of changing original colors and illuminating the displays and their backgrounds in different colors.

To provide the aforesaid exterior display rack with suitable driving means to receive detachable supports or articles to give additional motion to said articles or detachable supports independent of the motion of said rack.

To provide a ledge on said exterior display rack upon which articles or displays may be placed when desired not to rotate independently of the motion of said rack.

To provide means on said exterior display rack for alternately raising an article to an obscured position and lowering said article to a visible position as said exterior display rack passes the view opening of the aforesaid non-rotatable wall, and means for optional use of same.

To make novel provision whereby said exterior display rack may be rotated either intermittently or continuously.

To provide adjustable and changeable features to permit easy and desired changes as to color, space, background and motion, and To provide a generally practical construction which will be advantageous from standpoints of manufacture, sale and use.

With the foregoing in view, the invention resides in the novel subject matter, hereinafter described and claimed, description being accomplished by reference to the accompanying drawings.

Appropriate features of construction have been illustrated in the drawings and will be rather specifically described, with the understanding, however, that numerous variations may be made within the scope of the invention as claimed.

Referring more particularly to Figs. 6 and 10 to 14 inclusive, 20 denotes a suitable base upon which a plate 21 is secured by bolts or the like 22, said plate being provided with an arched bracket 23 having an upstanding angular arm 24 to which a tubular post 25 is non-rotatably secured in any suitable way. Surrounding the lower portion of this post 25 is an outer rotatable shaft 26 of tubular form. Within the tubular post 25 is an inner shaft 27 which extends both above and below said post, the upper end of this post being provided with a suitable bearing 28 for said shaft 27. The lower ends of the two shafts 26 and 27 are operatively connected with driving means which will be hereinafter described, all of said driving means being housed in an appropriate casing 29 secured to the base 20 and having an opening through which the assembled parts 25, 26 and 27 extend.

Referring now more particularly to Figs. 2, 6, 7 and 8, 29 denotes a rotatable interior display rack having a plate or platform 29ª carried by a hub 30 secured to the upper end of the shaft 26. Underlying this plate or platform 29ª and radiating from the hub 30, are a number of rods 31 secured in any suitable way to said hub and supported near their outer ends by brackets 32 secured to said plate or platform 29ª. The outer extremities of these rods 31 rigidly carry vertical bearings 33 in which vertical shafts 34 are rotatably mounted. Rotatable supports 35 for articles to be displayed, are detachably connected at 36 with the upper ends of the shafts 34, said supports 35 being disposed over the plate or platform 29ª. Under this plate or platform 29ª, the shafts 34 are provided with driving wheels 37 which are operated in a manner hereinafter described. If desired, any or all of the supports 35 may be detached from the shafts 34 and the articles to be displayed simply placed on the plate or platform 29ª.

Directly over the rods 31, the plate or platform 29ª is provided with radial slots 38 through which pass the lower ends of vertical posts 39, said post ends being secured to blocks 40 slidable upon the rods 31. Pairs of outwardly diverging frames 41 are pivotally connected at their inner ends with the posts 39, for instance, by means of eyes 42 on said frames surrounding said posts. These frames are preferably composed of detachably connected inner and outer sections 43 and 44 permitting easy insertion of any desired panels 45 and allowing panel changing when desired. These panels and the carrying frames therefor provide the interior display rack 29 with a plurality of peripheral compartments 46 within any or all of which the rotatable article supports 35 may be mounted for operation, and said panels 45 may carry any desired ornamental or pictorial representations to merely constitute a background for the articles to be displayed, or said panels may carry explanatory printed matter or advertising matter, or anything else.

Figures 7, 8:
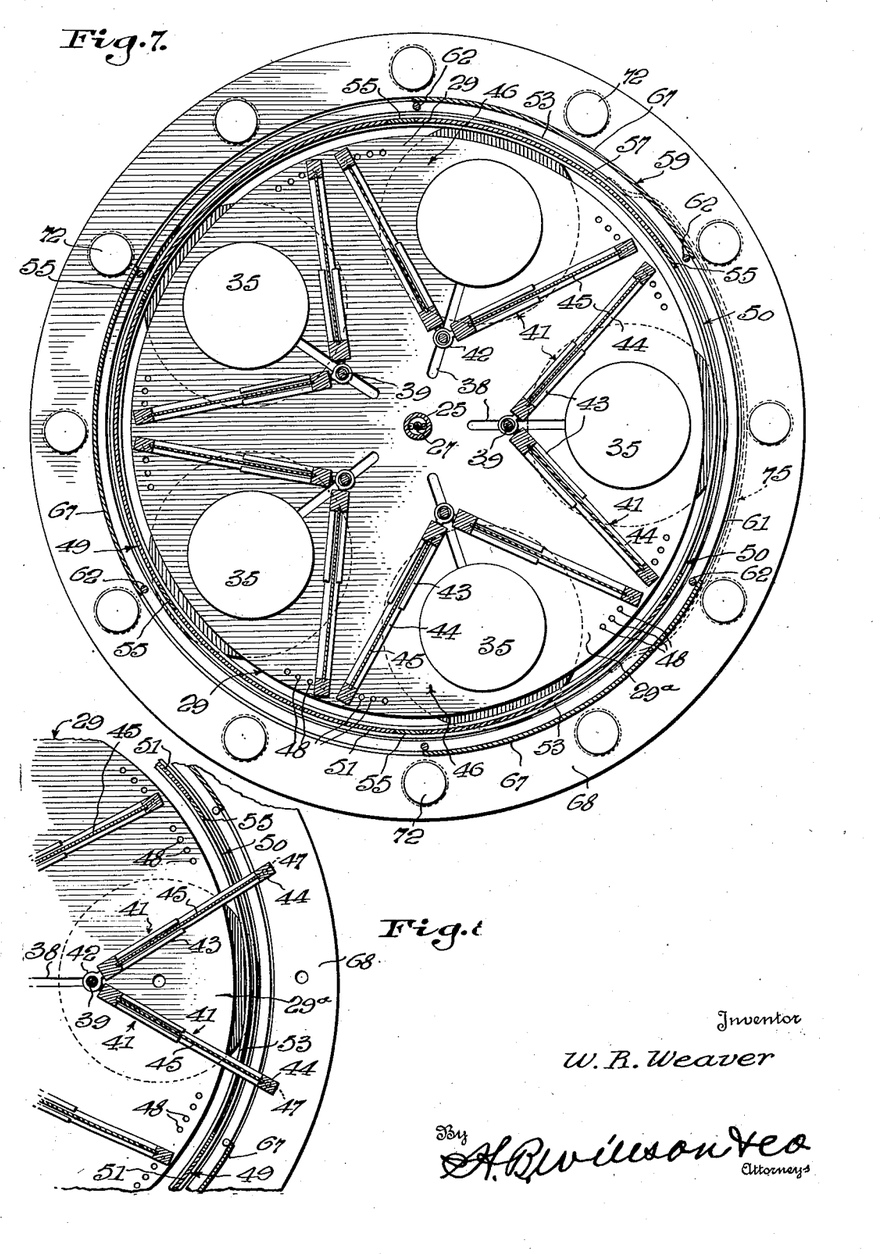
Fig. 7 is a horizontal sectional view on line 7—7 of Fig. 6.
Fig. 8 is a fragmentary view similar to a portion of Fig. 7 but illustrating two of the display-panel-holding-frames shifted outwardly for display changing.
Figure 9:
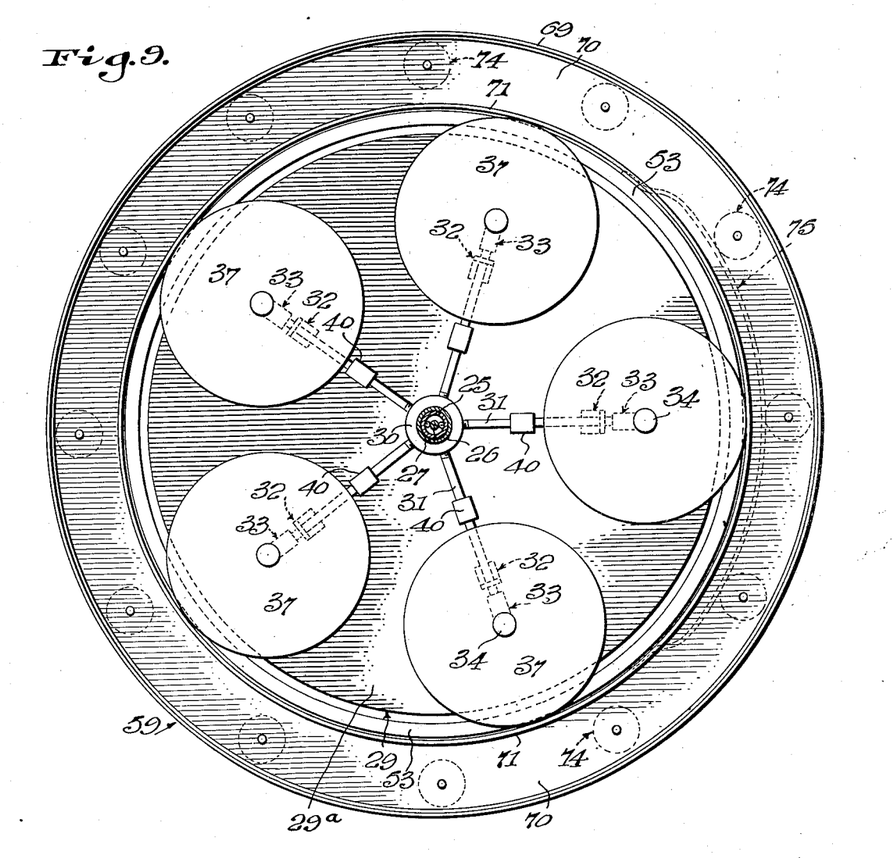
Fig. 9 is a horizontal sectional view on line 9—9 of Fig. 6.
Figure 10:
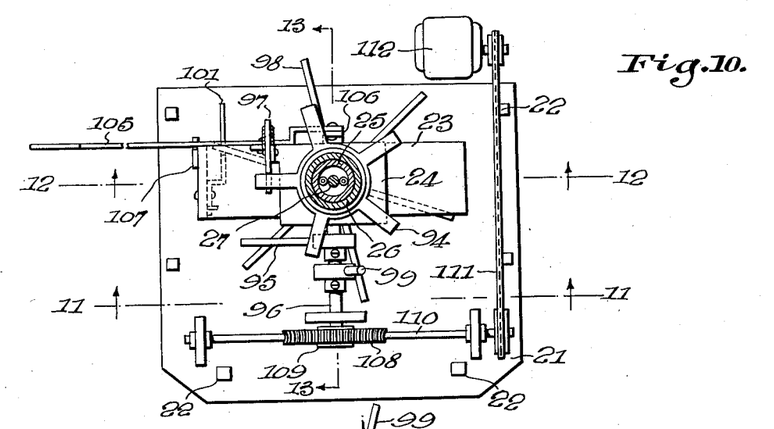
Fig. 10 is a horizontal sectional view on line 10—10 of Fig. 6.

The outer end of each frame 41 is provided with a downwardly projecting stud 47 receivable in any of a plurality of openings 48 in the plate or platform 29ª, permitting adjustment as may be desired. When the panels 45 are to be changed in one way or another, any pair of the frames 41 may be lifted until the studs 47 clear the openings 48, whereupon said pair of frames may be slid radially outward as seen in Fig. 8, the frame-carrying post 39 then sliding within the slot 38 and the block 40 sliding upon the underlying rod 31. When any pair of frames 41 is thus shifted outwardly, the frames of said pair are readily accessible for panel changing, etc.

Figure 4:
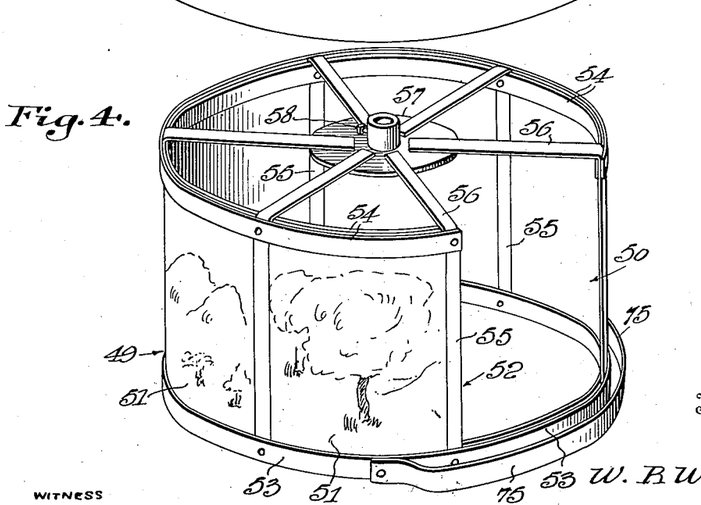
Fig. 4 is a perspective view of the non-rotatable wall which is disposed between the interior display rack of Fig. 2 and the exterior display rack of Fig. 3.
Figure 6:
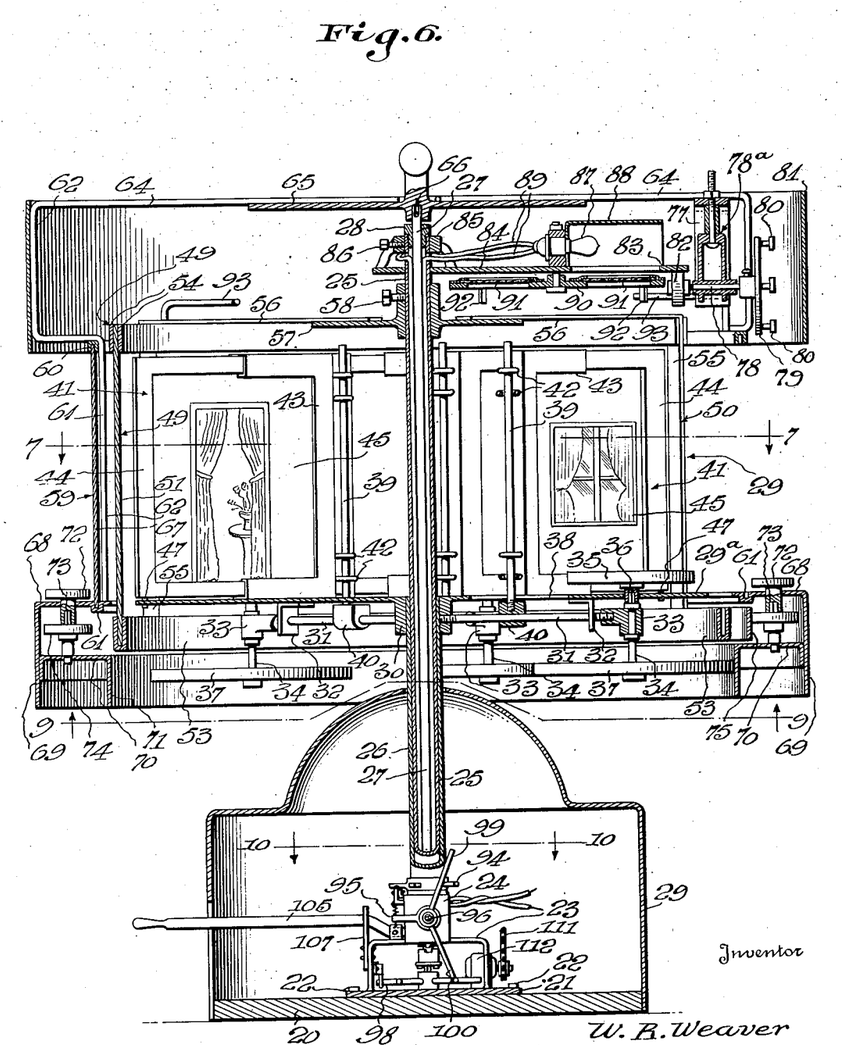
Fig. 6 is a vertical sectional view on line 6—6 of Fig. 5.

Surrounding the interior display rack 29 is a non-rotatable cylindrical wall 49, reference being now made more particularly to Figs. 4, 6, and 7, said wall 49 having a view opening 50 through which the displays on said interior display rack 29 are successively visible when the device is in operation. The wall 49 preferably consists of a plurality of exhibiting panels 51 and a skeletal holding frame 52 for said panels. In the present disclosure, this frame 52 includes a lower annular channel bar 53 in which the panels 51 rest, spaced arcuate bars 54 between which the upper ends of said panels are received, vertical posts 55 extending between and secured to the bars 54 and secured at their lower ends in the channel of the bar 53, and arms 56 extending inwardly from the upper ends of said posts 55 to a hub 57 which is suitably secured to the fixed post 25, a set screw 58 being shown for securing said hub and post together.

The panels 51 may carry pictorial ornamentation, any desired printed matter or anything else, and any panel may be upwardly withdrawn to be changed in any desired way or to be replaced with another panel.

A cylindrical exterior display rack 59 surrounds the stationary wall 49 and is shown more particularly in Figs. 1, 3, 5 and 6. In the present disclosure, this exterior display rack includes upper and lower annular channel members 60 and 61 rigidly carried by vertical posts 62, the upper ends of these posts being outwardly offset as at 63 and being provided with carrying arms 64 secured to a suitable hub 65, said hub having a pin and slot connection or other appropriate connection 66 with the upper end of the above described shaft 27. The rack 59 includes arcuate panels 67 which are slidably engaged with the channels 60 and 61, primarily to form material backs for display compartments of said rack 59, said panels 67 occupying circumferentially spaced positions when said rack 59 is to be intermittently rotated to expose displays to view several times in a single rotation of said rack. If the rack 59 is to be continuously driven, two of the panels 67 are slid into abutting positions at a definite operative relative point, and the other or third panel 67 is slid back of these two, the full length of the panel. This arrangement closes only two segments of the ledge 68 leaving four segments open, thus providing only one display compartment on the exterior display rack 59, or, all three panels 67 may be disengaged from channels 60 and 61 and the panel 67ª of Fig. 14 may be engaged in said channels at the same definite operative relative point, and again the same arrangement exists as before. Therefore, only two segments of the ledge 68 are closed, and four segments are open to permit proper as well as timely viewing of the displays carried by the interior display rack.

Figure 1:
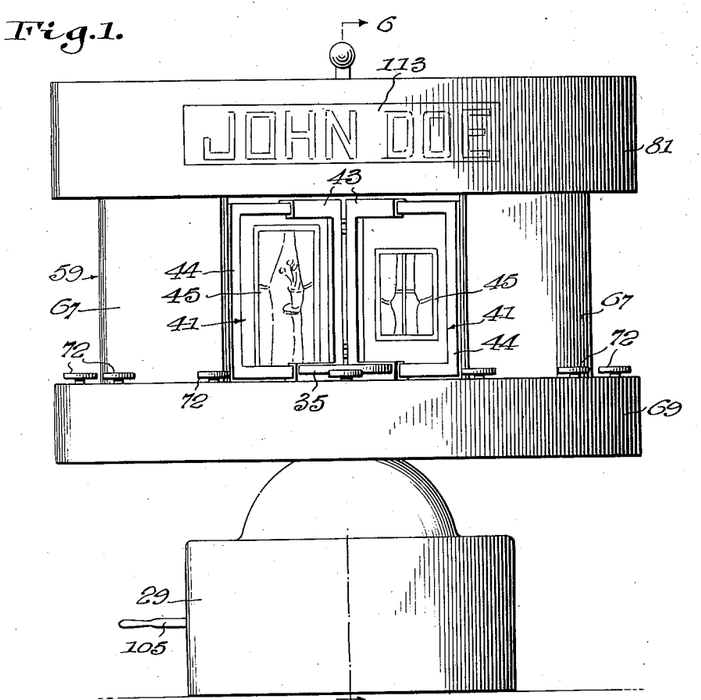
Fig. 1 is a front elevation.
Figure 2:
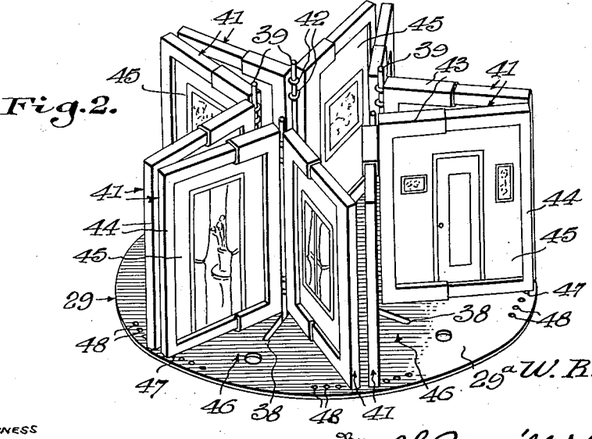
Fig. 2 is a perspective view of the rotatable interior display rack and the display-panel-holding-frames thereof.
Figure 3:
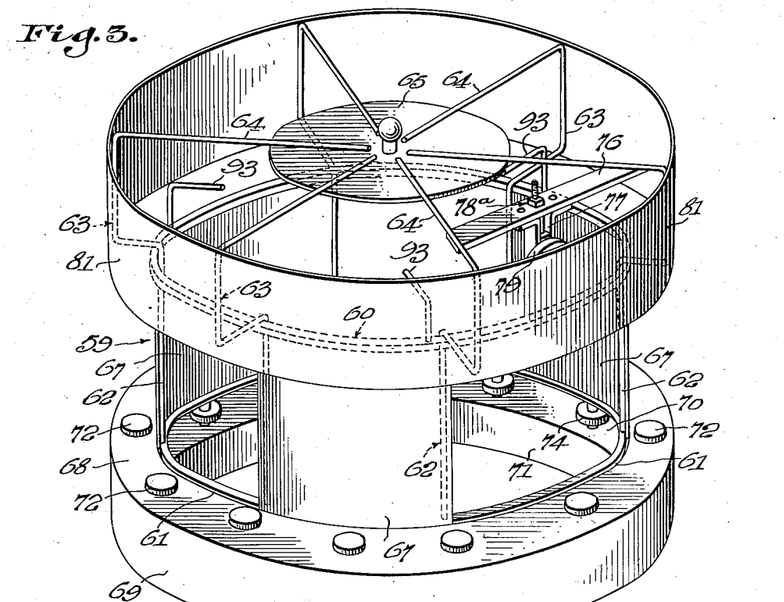
Fig. 3 is a perspective view of the exterior rotatable display rack.

The exterior rack 59 preferably includes the ledge 68 projecting outwardly from the lower channel 61, and upon this ledge, particles to be displayed may be placed. A skirt 69 projects downwardly from said ledge, in the present disclosure and is provided with an inwardly projecting annular flange 70 carrying a downwardly projecting annular track 71 which contacts with the wheels 37 above described, for the purpose of rotating the article supports 35 as the rack 59 rotates.

I preferably provide suitable rotatable supports 72 over the ledge 68, for small articles to be displayed, said supports 72 being detachably connected at 73 with driving wheels 74 appropriately mounted between the ledge 68 and flange 70. An arcuate track 75 (full lines in Figs. 4 and 6 and dotted in Fig. 7) is secured to the non-rotatable wall 49 to contact with the wheels 74, for the purpose of rotating the supports 72. Track 75 is disposed at the lower end of the view opening 50 and it will thus be seen that as each article on a support 72 moves across said view opening, it will be rotated.

Figure 5:
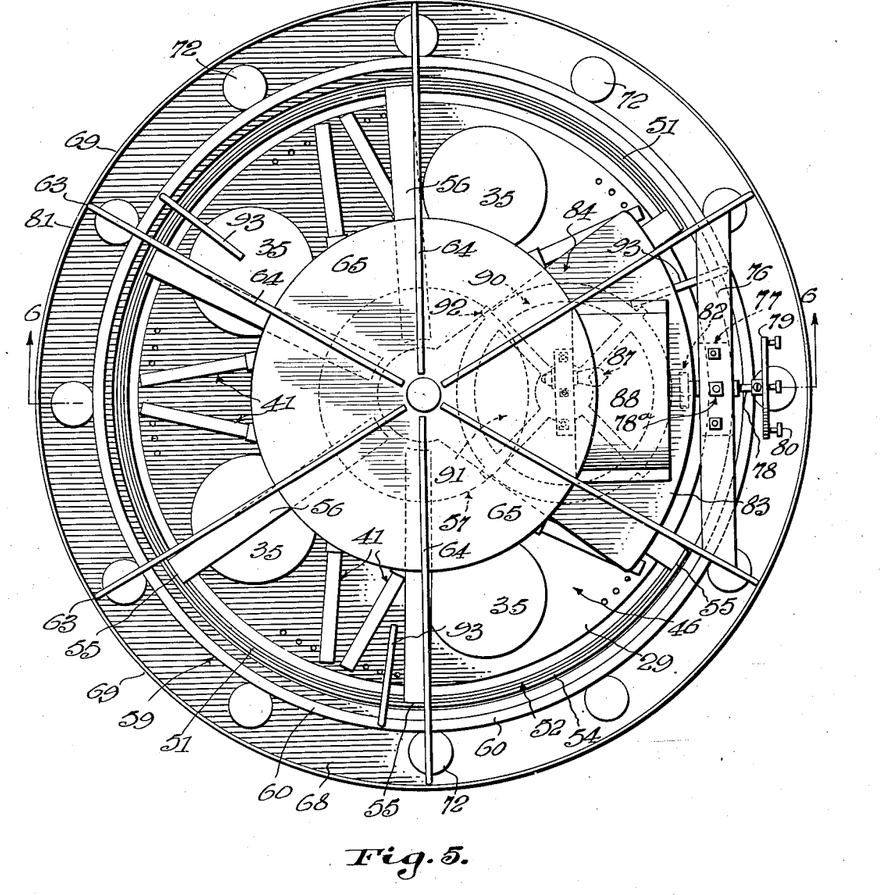
Fig. 5 is a top plan view.

Referring now more particularly to Figs. 3, 5 and 6, a bar 76 is secured to two of the arms 64, said bar carrying a bracket 77 which rotatably and adjustably supports a horizontal shaft 78 in a radial position, the outer end of said shaft being provided with a wheel 79 corresponding to a Ferris wheel. From stubs or the like 80 on this wheel, articles to be displayed may be suspended, and provision is made for rotating said wheel when desired to alternately raise and lower these articles. In this connection, an annular mask 81 is provided around and secured to the offset portions 63 of the posts 62, said mask portion 81 being disposed in outwardly spaced relation with the wheel 79 and in such position that the articles carried by said wheel will, upon rotation of said wheel, be alternately lowered into view below said mask portion and raised out of view behind said mask portion.

For rotating the wheel 79 each time it reaches a position near the upper end of the view opening 50, when desired, I provide the inner end of the shaft 78 with a driving wheel 82 cooperable with an arcuate fixed track 83, said track being preferably carried by the outer end of a horizontal bracket plate 84, shown more particularly in Figs. 5 and 6, said bracket plate 84 having a hub 85 secured by a set screw or the like 86 upon the upper end of the fixed post 25. The shaft 78 is vertically adjustable by any preferred means 78ª to either position the wheel 82 for contact with the track 83, or to prevent such contact, as desired, and suitable provision may be made to limit the adjustments of said shaft.

Changeable illuminating means is provided for the display, said means being illustrated more particularly in Figs. 5 and 6. A light bulb 87 is suitably mounted upon the plate 84 and is provided with an appropriate reflector 88, the current-conducting wires 89 for said bulb passing downwardly through a space provided for this purpose, between the inner shaft 27 and the post 25. A horizontal rotatable color wheel 90 is suitably mounted directly under the plate 84 and is provided with translucent panels 91 of different colors, through which the rays of light from the bulb 87 are downwardly projected. The wheel 90 is provided with circumferentially spaced projections 92 to be struck by arms 93 (Figs. 3, 5 and 6) carried by the exterior display rack 59 and preferably secured to the upper channel 60 thereof. Each time a display on the rack 29 is about to be made visible, one of the arms 93 engages one of the projections 92, turning the color wheel 90 to position one of its colored panels 91 under the bulb 87, causing illumination of the display in one color, and as the device continues to operate, the various displays will be illuminated with the various colors of the panels 91.

The driving means for the two racks 29 and 59 will now be described with reference more particularly to Figs. 6, and 10 to 13, said driving means being such that the exterior rack 59 alternately closes and opens the view opening 50 and the interior rack 29 turns to a different display position each time said view opening is closed by said exterior rack. The latter it will be recalled may be driven either intermittently or continuously. Upon the lower end of the shaft 26 is secured a star wheel 94, the arms of which are equal in number to the compartments 46 of the interior display rack 29. A radial arm 95 on a continuously driven shaft 96 is provided to coact with this star wheel 94 to effect intermittent turning of the rack 29, and an appropriate dog 97 is employed to hold said wheel 94 in each position to which it is turned by said arm 95. Another star wheel 98 is secured to the lower end of the shaft 27, and the driven shaft 96 is provided with two arms 99 and 100 cooperable with said star wheel 98 for the purpose of intermittently turning the exterior rack 59, a suitable pawl 101 being provided to hold said star wheel 98 in any position to which it is turned by said arms 99 and 100. When one of these arms engages an arm of the star wheel 98, the exterior rack 59 is turned to uncover the view opening 50, making a display on the interior rack 29 visible. When the other of said arms engages the next arm of the star wheel 98, it effects closing of the view opening 50 by moving a panel of the exterior rack 59 in front of said opening. The arm 95 then engages an arm of the star wheel 94 to turn the interior rack 29 to another display position, whereupon the exterior rack 59 again opens the display opening 50, and so on.

Figures 11, 12, 13:
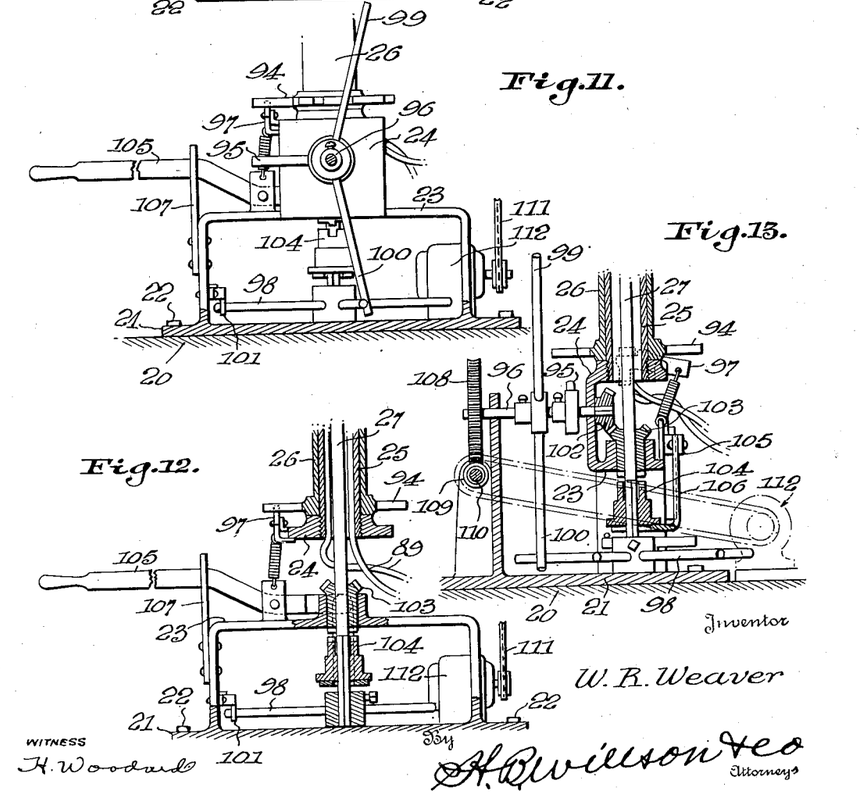
Figs. 11, 12 and 13 are vertical sectional views on lines 11—11, 12—12 and 13—13 respectively of Fig. 10.
Figure 14:
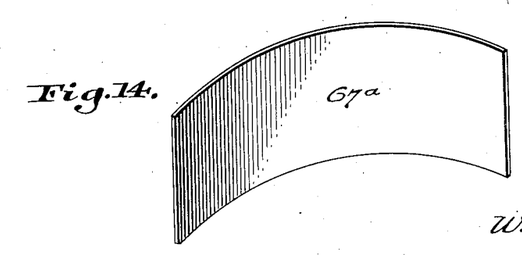
Fig. 14 is a perspective view of an elongated panel with which the exterior display rack may be provided when this rack is to be continuously rotated.

On the shaft 96, I have shown a bevel gear 102 which is secured to said shaft. Loose upon the shaft 27 is another bevel gear 103 constantly meshing with the gear 102. Slidable upon this shaft 27 is a clutch 104 operable by means of an appropriate lever 105 to connect the gear 103 positively with the shaft 27 when desired. When this is done, the continuous rotation of the shaft 96 will cause the gears 102 and 103 to continuously rotate the shaft 27, thereby continuously instead of intermittently driving the exterior rack 59. 106 denotes a link connected operatively with the lever 105 and clutch 104, and 107 denotes a rest into engagement with which said lever is swung to hold it in the position which it should occupy with the clutch 104 lowered as seen in Figs. 12 and 13.

For continuously driving the shaft 96, I have shown a worm gear 108 on said shaft meshing with a worm 109 on a cross shaft 110, said shaft 110 being driven by a chain, belt or the like 111 from an electric motor 112. However, it will be understood that any other desired driving means could be employed if desired.

The general operation is as follows, with the lever 105 set for intermittent operation of the exterior rack 59. Motor 112 effects continuous driving of the shaft 96, and the arms 99 and 100 of this shaft effect intermittent rotation of the exterior rack 59, alternately allowing and preventing vision through the view opening 50. Each time this view opening is closed, the arm 95 on the shaft 96, coacting with the star wheel 94, effects turning of the interior display rack 29 to present a different display behind the opening 50. This display is always effectively illuminated by the light from the bulb 87 passing through one or another of the colored translucent panels 91 of the wheel 90, which wheel is turned in a step-by-step manner by the arms 93 striking the projections 92. Each time the exterior rack 59 turns, its track 71 engages the wheels 37, causing the article supports 35 to rotate, and the rotation of the articles on said supports 35 is, of course, visible at times through the opening 50. Each time one of the wheels 74 strikes the track 75, the article supported on the support 72 connected with said wheel, rotates for conspicuous display, and if so desired, each time the wheel 79 approaches the front of the device, its driving wheel 82 engages the track 83 and causes operation of said wheel to lower an article into view and again raise it from view.

If continuous instead of intermittent operation of the exterior rack 59 be desired, the panels 67 are adjusted circumferentially as above described, or the additional panel 67a is substituted, the lever 105 is operated to engage the clutch 104 with the gear 103, and continuous operation of the exterior rack will then be effected.

During the rotation of the rack 59, whether intermittent or continuous, said rack not only cooperates with the opening 50 to alternately close and open the same, but it successively covers and uncovers the exhibiting panels 51 of the non-rotatable wall 49, giving a constantly changing scene. These panels may be removed and replaced with others, or otherwise changed whenever desired, and the same is true of the panels carried by the frames 41 of the interior display rack 29. These frames may be outwardly withdrawn through the view opening 50 as seen in Fig. 8, making them readily accessible for panel changing, and they may be easily restored to desired position, adjusted as required and held by replacing the studs 47 in the openings 48. Obviously, the supports 35 and 72, being detachably mounted, may or may not be used, as desired, and it will be understood that the particular shape of these supports is illustrative rather than limiting.

It is preferable to provide the mask portion 81 of the rack 59 with suitable means for holding a sign 113 (Fig. 1), particularly when the device is used for merchandise display and advertising, as said sign may then give the name of the merchant.

From the foregoing, taken in connection with the accompanying drawing, it will be seen that novel and advantageous provision has been made for carrying out the objects of the invention, and while appropriate features of construction have been illustrated, attention is again invited to the possibility of making numerous variations within the scope of the invention as claimed.

I claim:

1. A display device comprising a rotatable interior display rack, a non-rotatable wall surrounding said interior display rack and having a view opening through which displays on said interior display rack are visible, a rotatable exterior display rack surrounding said non-rotatable wall in operative relation with said view opening and said interior display rack, means for rotatably mounting said interior display rack and said exterior display rack, means for fixedly mounting said non-rotatable wall, means for rotating said exterior display rack to alternately present a display in front of said view opening and to expose the displays on said interior display rack back of said view opening, and means for turning said interior display rack to a different display position each time said exterior display rack presents a display in front of said view opening.

2. A display device comprising a rotatable interior display rack having rotatable supports to give motion to articles to be displayed, a non-rotatable wall surrounding said interior display rack and having a view opening through which said articles on said rotatable supports are successively visible, a rotatable exterior display rack surrounding said non-rotatable wall in operative relation with said view opening and said interior display rack, means for rotatably mounting said interior display rack and said exterior display rack, means for fixedly mounting said non-rotatable wall, and means for rotating said exterior display rack to alternately present a display in front of said view opening and expose the displays on said interior display rack, means for rotating said rotatable supports of said interior display rack, and means for turning said interior display rack to a different display position each time said exterior display rack presents a display in front of said view opening.

3. A display device comprising a rotatable interior display rack having shiftably mounted adjustable background-panel-holding-frames, a non-rotatable wall having a view opening at which said frames are successively visible and through which said frames are movable to change display panels, a rotatable exterior display rack surrounding said non-rotatable wall in operative relation with said view opening and said interior display rack, means for rotatably mounting said interior display rack and said exterior display rack, means for fixedly mounting said non-rotatable wall, means for rotating said exterior display rack to alternately present a display in front of said view opening and expose the displays on said interior display rack, means for the positional adjustment of said background-panel-holding-frames on said interior display rack, and means for turning said interior display racks to a different display position each time said exterior display rack presents a display in front of said view opening.

4. A display device comprising a rotatable interior display rack, a non-rotatable wall surrounding said interior display rack and composed of exhibiting panels and a skeletal frame detachably holding said panels, said non-rotatable wall having a view opening through which displays on said interior display rack are visible, a rotatable exterior display rack surrounding said non-rotatable wall in operative relative with said view opening and said exhibiting panels, means for rotatably mounting said interior display rack and said exterior display rack, means for fixedly mounting said non-rotatable wall, means for rotating said exterior display rack to alternately present a display in front of said view opening and successively expose said exhibiting panels and displays on said interior display rack back of said view opening, and means for turning said interior display rack to a different display position each time said exterior display rack presents a display in front of said view opening.

5. A display device comprising a rotatable interior display rack, a non-rotatable wall surrounding said interior display rack and having a view opening through which displays on said interior display rack are visible, a changeable color-illuminator for said interior display rack, a rotatable exterior display rack surrounding said non-rotatable wall in operative relation with said view opening and said interior display rack, means for rotatably mounting said interior display rack and said exterior display rack, means for changing said illuminator as said exterior display rack rotates, means for fixedly mounting said non-rotatable wall, means for rotating said exterior display rack to alternately present a display in front of said view opening and expose displays on said interior display rack back of said view opening, and means for turning said interior display rack to a different display position each time said exterior display rack presents a display in front of said opening.

6. A display device comprising a rotatable interior display rack, a non-rotatable wall surrounding said interior display rack and having a view opening through which displays on said interior display rack are visible, a rotatable exterior display rack surrounding said non-rotatable wall in operative relation with said view opening and said interior display rack, said exterior display rack having means for mounting articles to be displayed, means for rotatably mounting said interior display rack and said exterior display rack, means for fixedly mounting said non-rotatable wall, means for rotating said interior display rack to alternately present a display in front of said view opening and expose displays on said interior display rack back of said view opening, and means for turning said interior display rack to a different display position each time said exterior display rack presents a display in front of said view opening.

7. A display device comprising a rotatable interior display rack, a non-rotatable wall surrounding said interior display rack and having a view opening through which displays on said interior display rack are visible, a rotatable exterior display rack surrounding said non-rotatable wall in operative relation with said view opening and said interior display rack, said exterior display rack having rotatable supports for articles to be displayed, means for rotatably mounting said interior display rack and said exterior display rack, means for fixedly mounting said non-rotatable wall, means for rotating said exterior display rack to alternately present a display in front of said view opening and to expose displays in said interior display rack, means for rotating said article supports as said exterior display rack is rotated, and means to turn said interior display rack to a different display position each time said exterior display rack presents a display in front of said view opening.

8. A display device comprising a rotatable interior display rack, a non-rotatable wall surrounding said interior display rack and having a view opening through which displays on said interior display rack are visible, a rotatable exterior display rack surrounding said non-rotatable wall in operative relation with said view opening, an elevated wheel carried by said exterior display rack from which to suspend an article to be displayed, means whereby said wheel may be driven, said exterior display rack having a mask portion in outwardly spaced relation with said wheel, whereby the latter may alternately raise the article behind said mask portion and lower said article into view, means for rotatably mounting said display racks, means for fixedly mounting said non-rotatable wall, means for rotating said exterior display rack to alternately open and close said view opening, thereby alternately exposing and obscuring the displays on said interior display rack, and means for turning said interior display rack to a different display position each time said exterior display rack closes said view opening.

9. A display device comprising a base, a tubular standard spaced upwardly from said base, a bracket rigidly carrying said standard and secured to said base, an outer tubular shaft surrounding said standard and mounted rotatably, an inner rotatably mounted shaft within said standard and extending above and below the same, a rotatable interior display rack secured to said outer shaft, a stationary wall surrounding said interior display rack and having carrying means secured to said standard, said wall having a view opening through which displays on said interior display rack are visible, a rotatable exterior display rack surrounding said wall in operative relation with said view opening and having carrying means secured to the upper end of said inner shaft, and driving means for said outer and inner shafts mounted on said base and operatively connected with the lower ends of said shafts.

10. In a display device having a rotatable interior display rack, a rotary exterior display rack surrounding said interior display rack for alternately exposing and obscuring the same, rotatable supports carried by said interior display rack to support articles to be displayed, driving wheels for said supports carried by said interior display rack, and an annular track secured to said exterior display rack and contacting with said driving wheels to rotate said supports as said exterior display rack rotates.

11. In a display device having a rotatable interior display rack provided with a platform, a rotary exterior display rack surrounding said interior display rack for alternately exposing and obscuring the same, said exterior display rack extending downwardly beyond said platform, rotatable supports for articles to be displayed, said supports being mounted over said platform and having driving wheels below said platform, and an annular track secured to said downwardly projecting portion of said exterior display rack and contacting with said driving wheels to rotate said supports as said exterior display rack rotates.

12. In a display device having a rotatable interior display rack, and a rotatable exterior display rack surrounding the same; a non-rotatable wall between said racks composed of exhibiting panels and a skeletal holding frame for said panels, said wall having a view opening successively covered and exposed by said exterior display rack through which displays on said interior display rack are visible.

13. In a display device having a rotatable interior display rack, a rotatable exterior display rack surrounding the same, and a non-rotatable wall between said racks, said wall having an opening successively covered and exposed by said exterior display rack through which displays on said interior display rack are visible; an illuminating bulb and means mounting the same over said interior display rack, a color wheel and means mounting the same between said bulb and said interior display rack, said color wheel having translucent panels of different colors through any of which the bulb rays may pass to illuminate said interior display rack, and coacting means on said color wheel and one of said display racks for intermittently turning the former to successively position the differently colored panels under the bulb.

14. In a display device having changeable display means and a rotatable exterior display rack behind which change of display is effected; a continuously driven driving member for said rack, and operating connections between said driving member and said rack for driving the latter either continuously or intermittently as desired, said rack having circumferentially slidable arcuate panel portions relatively movable into one relation with each other when the rack is to be intermittently rotated and relatively movable into another relation with each other when the rack is to be continuously rotated.

15. In a display device having changeable display means and a rotatable exterior display rack behind which change of display is effected; a shaft connected with said rack, a star wheel secured to said shaft, a continuously driven shaft having an arm cooperable with said star wheel to drive the first mentioned shaft and the rack intermittently, two intermeshed gears one secured to one of said shafts and the other loose on the other of said shafts, and a clutch for connecting the loose gear with its respective shaft when desired, thereby taking the rack out of control of said star wheel and arm and continuously driving said rack by means of said gears.

16. In a display device having a rotatable display member, and a wall having an opening through which displays on said display member are successively visible; pairs of background-pane-holding-frames on said display member between the center and the periphery of the latter, the frames of each pair being hinged together and diverging toward said periphery of said display member, means shiftably mounting said pairs of frames on said display member for outward movement through said opening for display changing, and means for holding said pairs of frames normally against movement with respect to said display member.

17. In a display device having a rotatable display member, and a wall having an opening through which displays on said member are successively visible; pairs of background-panel-holding-frames on said display member between the center and the periphery thereof, vertical posts allotted one to each of said pairs of frames, means hinging the inner ends of the frames of each pair to the allotted post to permit movement of said frames toward and from each other, means slidably mounting said posts on said display member to permit outward movement of any of said pairs of frames through said opening for display changing, and means for holding said pairs of frames normally against movement with respect to said display member.

18. In a display device, an inner display rack, a rotatable exterior display rack surrounding said inner rack and having an opening for exposing a display on said inner rack, a vertical wheel mounted on said outer rack over said opening from which to suspend an article to be displayed, said outer rack having a mask portion spaced outwardly from said wheel, whereby the latter may alternately raise the article behind said mask portion and lower said article into view, a driving wheel for the aforesaid wheel mounted on said outer rack, a fixed arcuate track for contact with said driving wheel to operate the same, and means stationarily mounting said track in such position as to operate said driving wheel to lower the suspended article each time said opening exposes a display on said inner rack.

19. In a display device having a rotatable interior display rack, and a non-rotatably mounted wall surrounding said rack and having a view opening; a cylindrical exterior shutter surrounding said wall, said shutter comprising a circular member adjacent the lower end of said wall, posts secured to and extending upwardly from said circular member, a lower annular upwardly open channel member at the lower ends of said posts, an upper annular downwardly open channel member spaced above said lower channel member and secured to said posts, and panels extending between and removably held by said channel members, providing for easy change of panels for different decorative or other purposes, said panels being spaced apart circumferentially of the shutter to provide view openings for successive registration with the view opening of said wall to expose displays on said rack to view and to also expose any decorative or other matter which may be provided on the exterior of said wall; and means for mounting and driving said shutter, and said rack.

20. In a display device, a rotatably mounted interior display rack and a rotatably mounted exterior display rack surrounding said interior rack and constituting a shutter cooperable with said interior rack, said exterior display rack being fully exposed to view at all times, a continuously driven driving member and means for driving the same in one direction only, driving connections operatively connected with said continuously driven driving member and said interior rack for intermittently driving the latter in one direction, and additional driving connections operatively connected with said continuously driven driving member and said exterior rack for driving the latter reversely from said interior rack, said additional driving connections including means for driving said exterior rack either intermittently or continuously as desired.

21. In a display device having a rotatable display member, and a wall having a view opening through which displays on said display member are successively visible; pairs of adjustable background-panel-holding-frames on said display member between the center and the periphery of the latter, the frames of each pair being hinged together and diverging toward said periphery of said display member, each of said frames being composed of inner and outer sections having top and bottom members slidably engaged with each other to permit use of background panels of different widths and to allow easy changing of panels, and means for holding the frames of each pair in different positional relations with each other and for normally preventing movement of said frames upon said display member, any pair of said frames being movable outwardly through said view opening for convenient panel changing.

WILLIAM RUTLEDGE WEAVER.